UNITED STATES PATENT OFFICE.

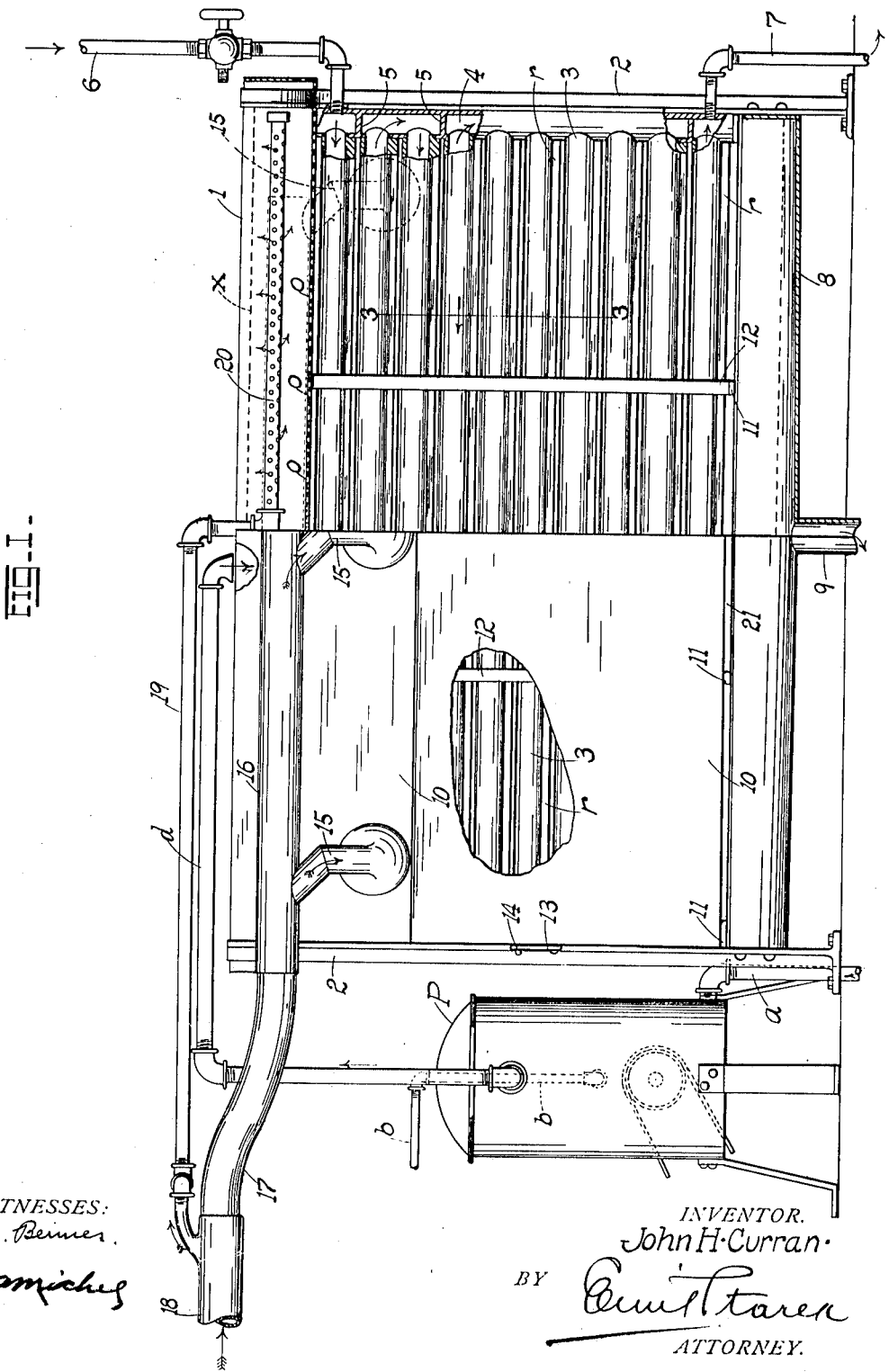

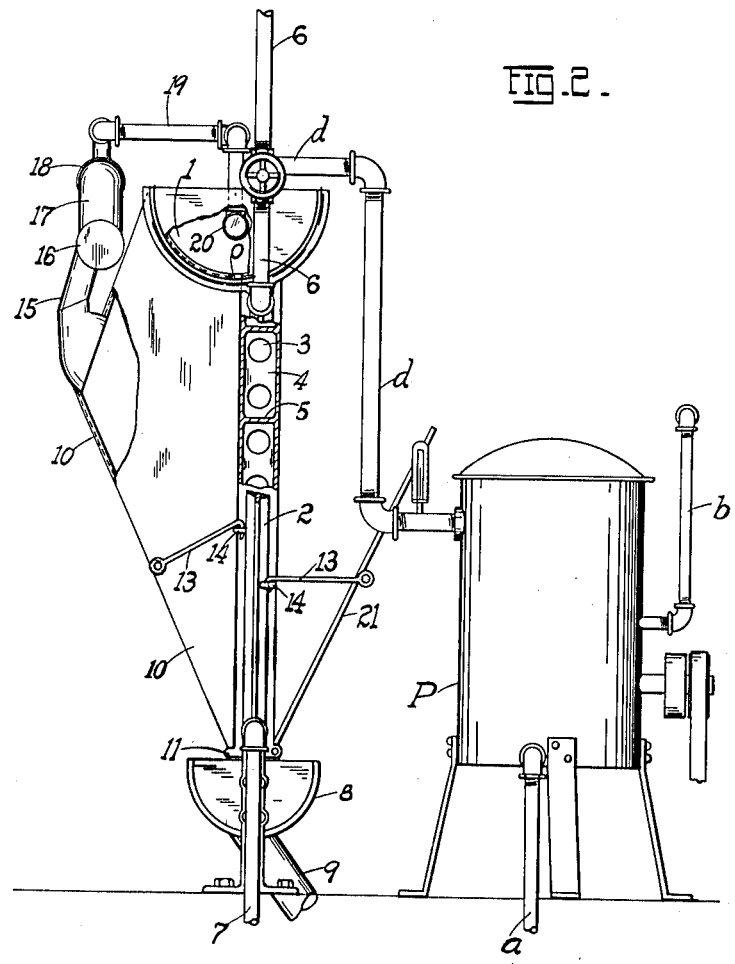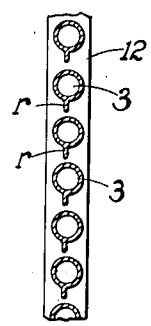

JOHN H. CURRAN, OF ST. LOUIS, MISSOURI, ASSIGNOR OF ONE-THIRD TO W. E. RIDELL AND ONE-THIRD TO WM. A. HUDSON, BOTH OF ST. LOUIS, MISSOURI.

APPARATUS FOR PURIFYING MILK AND CREAM.

949,295. Specification of Letters Patent. Patented Feb. 15, 1910.

Application filed April 17, 1909. Serial No. 490,544.

*To all whom it may concern:*

Be it known that I, JOHN H. CURRAN, citizen of the United States, residing at St. Louis, State of Missouri, have invented certain new and useful Improvements in Apparatus for Purifying Milk and Cream, of which the following is a full, clear, and exact description, reference being had to the accompanying drawings, forming a part hereof.

My invention has relation to improvements in apparatus for purifying cream and milk, and it consists in the novel features more fully set forth in the specification and pointed out in the claims.

In the drawings, Figure 1 is a half section and half longitudinal side elevation of the apparatus; Fig. 2 is an end view, with parts broken away; and Fig. 3 is a vertical sectional detail of the circulating pipes on the line 3—3 of Fig. 1.

The object of my invention is to subject pasteurized or hot cream and milk to the action of atmospheric air for the purpose of eliminating therefrom all deleterious gases, germs and noxious odors remaining therein at the conclusion of the pasteurizing process, thereby not only restoring to the milk or cream the life and freshness which it should possess for purposes of consumption, but in the case of cream to bring the same to a condition most favorable for churning in the manufacture of butter. The butter derived from cream so treated possesses a maximum degree of flavor, aroma and body so essential to a wholesome commercial product.

It is a well known fact that in the pasteurizing process, in which the milk or cream is subjected to a heat of from 180° to 190° Fahrenheit, not all deleterious germs are destroyed, and to boil the milk or cream is out of question. In fact, the milk or cream as it leaves the pasteurizer is not only flat and lifeless, but is entirely devoid of that percentage of air which is so essential to the permanent preservation of the article after it leaves the pasteurizer. By the subsequent treatment with air, all danger of fermentation and germination is prevented, and the milk or cream may keep fresh for a considerable period, under proper conditions. While the pasteurizing process destroys some germs, the presence of these dead germs and the fermentation gases resulting therefrom, and the undesirable odors to which such germs and others not destroyed give rise, must be got rid of to insure a product which is wholesome, and in the case of cream, from which the highest quality of butter may be produced. To these ends I have constructed an apparatus through which may be carried on a process by virtue of which new life may be injected into the cream or milk as the case may be, all as will herein more fully appear from a detailed description of the invention which is as follows:—

Referring to the drawings, P, represents the pasteurizing vessel into which the milk or cream is admitted through a pipe $a$ from any suitable source and under sufficient head, the contents of the vessel being kept at a temperature of from 180° to 190° Fahrenheit by means of steam admitted through a steam-pipe $b$ as shown. Leading from the pasteurizer is a discharge pipe $d$ which discharges the pasteurized milk at substantially the temperature of pasteurization above referred to.

The features just described are well known in the art, and no detailed description of the pasteurizer is necessary as it forms no part of the present invention.

The milk discharged from the pipe $d$ is received into an elongated trough or container 1, provided with bottom perforations $o$ through which the milk is constantly escaping. The trough 1 is supported between the standards 2, 2, between which and immediately beneath the trough, but to one side of the perforations $o$ are disposed a series of superposed brine circulating pipes 3, 3, the ends of the pipes terminating in headers 4, 4, a partition wall or diaphragm 5 being located across the header between each pair of pipes, so that the circulation of the brine shall be continuous back and forth through the series. The brine which enters at about 18 to 20 degrees Fahrenheit is introduced through a supply pipe 6 leading into the header opposite the top pipe of the series, and the brine leaves the system of pipes through an outlet or discharge pipe 7, the temperature of the outflowing brine being approximately 40° Fahrenheit. Beneath the cooling pipes 3 is a catch basin or trough 8 which slopes from opposite sides toward a central discharge spout 9.

Disposed on one side of the vertical series of cooling pipes 3, is a shield 10 having as shown terminal vertical walls, and downwardly and upwardly inclined side walls, the lower edge of the shield resting on lugs 11 formed at the bottoms of the headers 4, 4, and at the bottoms of the spacing members 12 by which the pipes 3 are spaced apart at points intermediate the headers. Once the shield is supported on the lugs 11, it is secured in position by the swinging latches 13, one end of which is secured to the end wall of the shield, the free end of the latch being passed over a staple 14 carried by the standard 2. Tapping the upper inclined wall of the shield 10 at convenient points are branch pipes or shunts 15 which lead from an air supply pipe 16, the latter being connected by a coupling 17 with a main 18 leading to any source of compressed-air supply, a fan or blower as the case may be. Leading from the main 18 is a branch 19 which discharges into a perforated air-pipe 20 normally submerged below the surface of the milk or cream in the trough 1. The opposite side of the vertical series of cooling pipes 3 is exposed with the exception of the bottom where there is pivotally supported a deflector or inclined apron 21, the same being hinged along its bottom edge between the standards 2, 2, and additionally latched to the standards 2, 2, by latches 13 and staples 14.

The operation will now be apparent from the drawings, and the foregoing description:—As the hot milk or cream is discharged from the pasteurizer from the pipe d into the trough or container 1, it fills the trough to a level indicated by the dotted line x, the milk thence escaping through the perforations o and trickling over the brine-cooled surfaces of the vertical series of circulating pipes 3, in this trickling the milk being formed practically into a sheet in which form it is well exposed to the air currents delivered against it from the pipes 15. The air current being turned on a portion of it, branches off into the pipe 19, whence it rushes into the perforated pipe 20 normally submerged below the milk level in the container 1, the air escaping in the form of jets which are thus directed through the hot milk in the container 1. In this action the air not only partially cools the milk (or cream) but expels from the milk all foul odors, destroying injurious germs and foreign substances; and as the aerated milk leaves the container and spreads itself into a form of a sheet over the surfaces of the pipes 3, it is not only thoroughly cooled, but is at the same time exposed to the air currents delivered against it by the pipes 15; and since these pipes terminate in flaring mouths the air sweeps across the sheet of milk as quite obvious from the drawings. To prevent the milk sheet from being carried beyond the limits of the discharge trough or catch-basin 8, the apron 21 is so located as to intercept any particles which might otherwise be accidentally carried beyond the basin. As seen in Fig. 2, the vertical wall of piping along which the milk flows after it leaves the container 1 is to one side of the perforations o of the container, so that the milk adheres to that side of the pipes facing the perforations. The several pipes are provided with ribs r at the bottom which serve to direct the milk sheet from one pipe to the other, the milk dripping off the ribs on to the pipes. Of course, in practice the air current which acts against the sheet of milk may be generated by either a blower or a suction fan. So too may air be sucked through the container 1 instead of forced into it, it being no consequence by what means the current is generated. The designation "milk" as used in the claims is of course, to be understood to comprehend cream as well, the apparatus and process being applicable to the purification of either. The product when finally drawn from the catch-basin 8 is found to be absolutely pure, fresh, all flatness having been removed therefrom; and in the case of cream, the latter lends itself to a rapid production of butter when churned, the air absorbed thereby serving to maintain the cream at the low temperature so desirable in the churning operation. Not only the milk and cream, but the butter as well is highly palatable and always sweet, no germs remaining which may conduce to any character or kind of fermentation or decomposition of the milk constituents.

Obviously the parts 10 and 21 may be removed at any time to afford access to the pipes 3.

In lieu of brine, ordinary water or other cooling medium may circulate through the pipes.

Such features of construction as may appear on the drawings, but to which no reference is made are old and well known, and require no description in this connection.

Having described my invention, what I claim is:—

1. In combination with a milk pasteurizing apparatus, a suitable container for receiving the warm milk from the pasteurizer, means for subjecting the milk in the container to agitation by atmospheric air, and means for removing the milk from the container after the treatment aforesaid, and means for subsequently cooling the same.

2. In combination with a milk pasteurizer, means for receiving the milk therefrom, means for subjecting the milk to agitating currents of atmospheric air, and cooling devices over which the milk passes, said cooling devices being maintained at a predetermined temperature by contact with a suitable circulating cooling medium.

3. In combination with a milk pasteurizer, a container for receiving the warm milk discharged from the pasteurizer, means for forcing streams of air through the contents of the container, means for conducting the milk from the container over suitable cooling surfaces, and means for directing a blast of air against the milk while passing over said cooling surfaces.

4. In combination with a milk pasteurizer, a container having a perforated bottom for the reception and discharge of the milk, a perforated pipe for injecting air through the milk in the container, suitable cooled surfaces over which the milk flows upon leaving the container, and means for delivering blasts of air against the milk flowing over said cooled surfaces.

5. In combination with a milk pasteurizer, a container having a perforated bottom for the reception and discharge of the milk, a perforated pipe in the container for injecting air into the milk while in the container, a series of cooled pipes over which the milk from the container flows in thin streams or sheets, and means for conducting currents of air against such milk sheets.

6. In combination with a milk pasteurizer, a container having a perforated bottom for receiving the contents of the pasteurizer, a vertical wall composed of a series of cooling pipes spaced a suitable distance apart, said wall being disposed in a plane to one side of the perforations in the container, a shield disposed on the opposite side of the container, means for directing currents of air across the milk escaping from the container and running along the pipes, a catch-basin for the cooled milk, and a perforated pipe submerged in the milk in the container, and delivering jets of air into the milk therein while substantially at the temperature at which it leaves the pasteurizer.

7. A container for hot milk provided with means for forcing jets of air through said milk, means for conducting the milk over a suitable cooling surface in the form of sheets, and means for directing currents of air against such sheets.

In testimony whereof I affix my signature, in presence of two witnesses.

JOHN H. CURRAN.

Witnesses:
 EMIL STAREK,
 JOS. A. MICHEL.